US006750318B2

(12) United States Patent
Tanaka et al.

(10) Patent No.: US 6,750,318 B2
(45) Date of Patent: Jun. 15, 2004

(54) POLYAMIDE RESINS AND PROCESS FOR PRODUCING THE SAME

(75) Inventors: Kazumi Tanaka, Niigata (JP); Takatoshi Shida, Niigata (JP); Hideyuki Kurose, Niigata (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 10/192,716

(22) Filed: Jul. 11, 2002

(65) Prior Publication Data

US 2003/0023028 A1 Jan. 30, 2003

(30) Foreign Application Priority Data

Jul. 19, 2001 (JP) ........................................ 2001-219984

(51) Int. Cl.$^7$ ........................ C08G 69/08; C08G 69/26; C08G 69/28
(52) U.S. Cl. .................. 528/310; 528/170; 528/332; 528/335; 528/336; 528/340; 528/329.1
(58) Field of Search ................................ 528/170, 310, 528/332, 335, 336, 329.1, 340

(56) References Cited

U.S. PATENT DOCUMENTS

| 3,616,963 | A | | 11/1971 | Sinnott ........................ 203/29 |
|---|---|---|---|---|
| 3,647,054 | A | | 3/1972 | Tsuboi et al. ................ 222/132 |
| 4,433,136 | A | | 2/1984 | Miyamoto et al. ........... 528/347 |
| 5,504,185 | A | * | 4/1996 | Toki et al. .................... 528/336 |
| 5,576,415 | A | * | 11/1996 | Tanaka ......................... 528/310 |
| 6,303,741 | B1 | * | 10/2001 | Tanaka ......................... 528/332 |
| 6,326,460 | B1 | | 12/2001 | Mohrschladt et al. ........ 528/492 |
| 6,489,435 | B2 | * | 12/2002 | Tanaka et al. ................ 528/310 |
| 6,559,273 | B2 | * | 5/2003 | Shida et al. .................. 528/310 |
| 6,610,816 | B2 | * | 8/2003 | Kurose et al. ................ 528/310 |
| 6,657,037 | B2 | * | 12/2003 | Tanaka et al. ................ 528/170 |

FOREIGN PATENT DOCUMENTS

| EP | 1 029 883 | | 8/2000 |
|---|---|---|---|
| EP | 1 277 783 A1 | * | 1/2003 |
| JP | 57-200420 | * | 12/1982 |
| JP | 05-078474 | * | 3/1993 |
| JP | 10-259242 | * | 9/1998 |
| WO | WO 9/43407 | | 2/1999 |

OTHER PUBLICATIONS

European Search Report dated Nov. 8, 2002, for EP 02 01 5335.
Patents Abstracts of Japan, Publication No. 05 078474, dated May 30, 1993.

* cited by examiner

Primary Examiner—P. Hampton-Hightower
(74) Attorney, Agent, or Firm—Antonelli, Terry, Stout & Kraus, LLP

(57) ABSTRACT

The polyamide resin of the present invention is produced by the polycondensation of a dicarboxylic acid component and a diamine component containing xylylenediamine and bisaminomethylcyclohexane in a total amount of 70 mol % or higher. The polyamide resin contains impurities having a boiling point of from 150 to 300° C. at ordinary pressure and a solubility parameter of from 8 to 16 in a total amount of 0.3% by weight or lower based on the weight of the polyamide resin. The polyamide resin is free from various inconveniences due to inclusion of the impurities, and suitably used in applications for molding materials, bottles, sheets, films and fibers.

12 Claims, No Drawings

POLYAMIDE RESINS AND PROCESS FOR PRODUCING THE SAME

FIELD OF THE INVENTION

The present invention relates to polyamide resins produced by the polycondensation of a dicarboxylic acid component and a diamine component, and more particularly to polyamide resins with the content of specific impurities being reduced so as to have an excellent moldability and processability.

BRIEF DESCRIPTION OF THE PRIOR ART

Polyamide resins generally contain a certain amount of impurities, typically water. Other impurities include cyclic or linear monomers and their oligomers such as dimers and trimers which are by-produced during the polymerization operation and included into resulting polyamide resins. When impurities accompanied with monomers do not take part in the amidation reaction, the impurities remain as such in resulting polyamide resins without being incorporated into the polyamide backbone chains.

These impurities contained in polyamide resins cause various problems upon molding and processing. For example, dirt adhesion on a mold, sink mark on molded articles and surface roughening of molded articles generally called as silver surface occur in injection molding process. In extrusion process, burning of die, surface roughening of molded articles and deposition of low-molecular substances on the surface of molded articles generally called as bleeding are caused. In the production of fibrous articles, yarn breakage and variation in yarn diameter occur.

The impurities cause other inconveniences during the molding and processing steps and adversely affect the resulting molded and processed products by accelerating yellowing during molding and processing steps, accelerating yellowing with time, decreasing the melt viscosity stability, deteriorating properties of molded articles, and contaminating packaged contents by elution. Thus, it has been required to minimize the amount of impurities in polyamide resins.

Water is highly compatible with polyamide resins and can be present in molten polyamide resins at a certain ratio. When the amount of water is controlled to the saturation amount to polyamide resin at the molding temperature or to a lower amount, water does not cause fatal problem to the molding and processing steps while the melt viscosity is slightly affected. Impurities being vaporized around at the molding temperature of polyamide resins, however, are largely responsible for the inconveniences described above, because such impurities are easily separable from polyamide resins. Therefore, it is desirable to minimize the content of such impurities. In particular, impurities such as alcohols, aldehydes and nitrites, which are likely to be accompanied with the starting monomers for polyamide resins, are less reactive with polyamide resins and are separated from polyamide resins without incorporated into the polyamide resin backbone chains during the melt polymerization or melt molding process, resulting in various inconveniences during the molding and processing steps. Therefore, the removal of these impurities should be fully considered.

In the production of polyamide resins of nylon 6 type by the polymerization of aminocarboxylic acids or lactams, an extraction operation for removing cyclic oligomers is conducted after the polymerization, generally using a hot-water extraction column. Polyamide pellets are fed into an upper portion of the extraction column, brought into a counter flow contact with a hot water fed from the bottom thereof, and then continuously removed from a lower portion of the extraction column. After the extraction procedure, the polyamide resins are dried to obtain a final product. By this extraction procedure, a considerable part of linear oligomers and impurities accompanied with monomers are removed together with the cyclic oligomers. Japanese Patent Application Laid-Open No. 60-101120 discloses a method in which the removal of unreacted monomers from nylon 6 resins and the post-polymerization are simultaneously conducted.

Unlike the production of polyamide resins of nylon 6 type, the above extraction procedure is generally not employed in the production of polyamide resins comprising a diamine component and a dicarboxylic acid component because of a smaller amount of low-molecular substances such as cyclic oligomers. Although the extraction procedure for removing impurities as employed in the production of polyamide resins of nylon 6 type is also very effective to improve the quality, such an extraction procedure has been omitted from economical viewpoints.

The impurities accompanied with monomers also can be removed during the preparation of nylon salt solution by a method including the precipitation of nylon salts by the addition of methanol, etc. and the subsequent separation by filtration. This procedure, however, leads to economically large burdens. In addition, with recent improvement in the purity of monomers, this procedure is generally omitted.

Accordingly, it has been demanded to develop polyamide resins with their impurities being efficiently removed, preferably by a low-cost method.

SUMMARY OF THE INVENTION

An object of the present invention is to provide a high-quality polyamide resin produced by the polycondensation of a dicarboxylic acid component and a diamine component mainly comprising m-xylylenediamine and bisaminomethylcyclohexane, which is suitable for various applications such as molding materials, bottles, sheets, films and fibers.

As a result of extensive research, the inventors have found that the above object is achieved by a polyamide resin that is minimized in the content of impurities, especially impurities having a limited boiling point and a limited solubility parameter (SP). The present invention has been accomplished on the basis of this finding.

Thus, the present invention provides a polyamide resin produced by the polycondensation of a dicarboxylic acid component and a diamine component containing xylylenediamine and bisaminomethylcyclohexane in a total amount of 70 mol % or higher, wherein a total content of impurities having a boiling point of from 150 to 300° C. under ordinary pressure and a solubility parameter (SP) of from 8 to 16 is 0.3% by weight or lower based on the weight of the polyamide resin.

DETAILED DESCRIPTION OF THE INVENTION

The diamine component as a starting monomer of the polyamide resin contains xylylenediamine and bisaminomethylcyclohexane in a total amount of 70 mol % or more. Examples of the xylylenediamine include m-xylylenediamine, p-xylylenediamine and o-xylylenediamine. Examples of the bisaminomethylcyclohexane include 1,2-bisaminomethylcyclohexane, 1,3- bisaminomethylcyclohexane and 1,4-bisaminomethylcyclohexane. These diamines may be used alone or in combination of two or more. When the xylylenediamine is predominantly used, the diamine component preferably contains m-xylylenediamine in an amount of 50 mol % or more, more preferably 70 mol % or more from the standpoint of useful properties of the resulting polyamide resins. When the bisaminomethylcyclohexane is predominantly used, the diamine component preferably contains 1,3-bisaminomethylcyclohexane in an amount of 50 mol % or more, more preferably 70 mol % or more from the standpoint of useful properties of the resulting polyamide resins.

Examples of the other diamine components include tetramethylenediamine, pentamethylenediamine, hexamethylenediamine, heptamethylenediamine, octamethylenediamine, nonamethylenediamine, o-phenylenediamine, m-phenylenediamine and p-phenylenediamine.

Examples of the dicarboxylic acid component include succinic acid, glutaric acid, adipic acid, suberic acid, sebacic acid, dodecanedioic acid, isophthalic acid, terephthalic acid, phthalic acid, and 2,6-naphthalenedicarboxylic acid. These dicarboxylic acids may be used alone or in combination of two or more. From the standpoint of useful properties of the resulting polyamide resins, 70 mol % or more of the dicarboxylic acid component is preferably adipic acid. As the components of the polyamide resins other than the diamine component and the dicarboxylic acid component, there may be used lactams such as caprolactam, valerolactam, laurolactam and undecanolactam; and aminocarboxylic acids such as 11-aminoundecanoic acid and 12-aminododecanoic acid.

The solubility parameter described herein (hereinafter referred to merely as "SP") is a useful indication for evaluating the compatibility of a compound, which is represented by the square root of a molar cohesive energy density of a liquid and signifies a magnitude of the intermolecular force. SP can be experimentally determined by measuring a heat of vaporization and a vapor pressure, or calculated according to the method proposed by Small (J. Appl. Chem., 3, 71 (1953)).

Among possible impurities to be contained in polyamide resins, those having a boiling point of from 150 to 300° C. under ordinary pressure (about 0.1 MPa) and SP of from 8 to 16 (hereinafter referred to as "target impurities") should be particularly noted, and, in the present invention, the total content of the target impurities should be limited to 0.3% by weight or less based on the amount of polyamide resin.

Impurities having a boiling point of 300° C. or lower are vaporized around at the molding temperature of polyamide resins and, as a result, exert various drawbacks on the molding/processing steps of polyamide resins.

Impurities having a boiling point exceeding 300° C. give less influence on the molding/processing steps although vaporized slightly, and therefore, the content thereof is not particularly restricted.

A substantial part of impurities having a boiling point lower than 150° C. are distilled away from the reaction system during the polymerization. Even if such impurities remain in the polyamide resins without removed from the reaction system, the impurities can be readily removed from the polyamide resins without deteriorating their quality by pre-treating, for example, by heating at 100 to 150° C. under vacuum.

Impurities having SP of more than 16 are well compatible with polyamide resins and not distilled away from the reaction system. Therefore, the impurities are hardly separated from polyamide resins during the molding/processing steps even though the boiling point thereof is in the range of from 150 to 300° C., thereby causing substantially no inconvenience mentioned above.

Impurities having SP of less than 8 are less compatible with polyamide resins and readily distilled away from the reaction system during the polymerization under reduced pressure by forming an azeotropic mixture with condensation water, even if the boiling point thereof is in the range of from 150 to 300° C. under ordinary pressure. Even if the impurities remain in the polyamide resins without removed from the reaction system, the impurities can be readily distilled away from polyamide resins without deteriorating their quality by pre-treating, for example, by heating at 100 to 150° C. under vacuum.

Impurities such as alcohols, nitrites, amines, carboxylic acids, amides and aldehydes are more likely to be included in polyamide resins. In the case of the polyamide resin produced by the polycondensation of the carboxylic acid component and the diamine component containing xylylenediamine and bisaminomethylcyclohexane in a total amount of 70 mol % or more, aromatic and alicyclic alcohols, aromatic and alicyclic aldehydes and aromatic and alicyclic nitrites should be especially noted as the target impurities. As known in the art, the impurities such as aromatic and alicyclic alcohols promote yellowing of polyamide resins. In addition, since such impurities are unlikely to be incorporated into polyamide backbone chains by the reaction, the impurities are apt to be separated from molten polyamide resins, resulting in various inconveniences as described above in the molding/processing operation.

The starting monomers are primarily responsible for the contamination of polyamide resins with the target impurities. Therefore, the object of the present invention is nearly completely achieved by controlling the starting monomers, thereby enabling effective reduction of the total content of the target impurities in polyamide resins.

The diamine component is generally purified by distillation. It is effective to select distillation conditions such as the number of stages and reflux ratio based on the kinds of target impurities. The production process of the diamine component usually includes an ammoxidation step and a hydrogenation step. The generation of the impurities in these steps can be inhibited by a detailed consideration to, for example, the solvent to be used in each step, increase of the degree of purification, improvement of the selectivity of catalyst, and optimization of the reaction conditions. In addition, hydrocarbons as raw materials of the diamine component should be purified so as not to produce the impurities in the ammoxidation and hydrogenation steps.

For examples, m-xylylenediamine and p-xylylenediamine are accompanied by the target impurities such as phenol, benzyl alcohol, m-tolunitrile, p-tolunitrile, 3-methylbenzyl alcohol, 4-methylbenzyl alcohol, 3-cyanobenzyl alcohol, 4-cyanobenzyl alcohol, isophthalonitrile, terephthalonitrile, 2,4-dimethylbenzyl alcohol, 2,5-dimethylbenzyl alcohol, 3,4-dimethylbenzyl alcohol, 3,5-dimethylbenzyl alcohol, 3,5-dimethylbenzaldehyde, 3-cyanobenzaldehyde, 4-cyanobenzaldehyde, 3-cyanobenzoic acid, 4-cyanobenzoic acid, 1,3-bisaminomethylcyclohexane, 1,4-bisaminomethylcyclohexane, and trimethylphenol. 1,3-Bisaminomethylcyclohexane and 1,4-bisaminomethylcyclohexane are accompanied by the target impurities such as phenol, benzyl alcohol, m-tolunitrile, p-tolunitrile, 3-methylbenzyl alcohol, 4-methylbenzyl alcohol, 3-cyanobenzyl alcohol, 4-cyanobenzyl alcohol, isophthalonitrile, terephthalonitrile, 2,4-dimethylbenzyl alcohol, 2,5-dimethylbenzyl alcohol, 3,4-dimethylbenzyl alcohol, 3,5-dimethylbenzyl alcohol, 3,5-dimethylbenzaldehyde, 3-cyanobenzaldehyde, 4-cyanobenzaldehyde, 3-cyanobenzoic acid, 4-cyanobenzoic acid, m-xylylenediamine, p-xylylenediamine, trimethylphenol, 3-methyl-1-aminomethylcyclohexane, 2,4-dimethylcyclohexylmethanol, 2,5-dimethylcyclohexylmethanol, 3,4-dimethylcyclohexylmethanol and 3,5-dimethylcyclohexylmethanol.

The dicarboxylic acid is generally purified by crystallization. It is effective to determine crystallization conditions such as frequency of rinsing operations and crystallization temperature based on the kinds of impurities.

For example, adipic acid is accompanied by the target impurities such as caproic acid, succinic acid, glutaric acid, 2-hexenedioic acid, 3-hexenedioic acid, heptanedioic acid, nonanedioic acid, decanedioic acid, undecanedioic acid, dodecanedioic acid, tetradecanedioic acid, hexadecanedioic acid, 5-cyanovaleric acid, 5-nitrovaleric acid, octadecanoic acid, hexanol, and cyclopentanone. Monocarboxylic acids and other dicarboxylic acids are incorporated into the polyamide backbone chains by the amidation reaction, and therefore hardly revealed as the impurities upon analysis of polyamide resins.

Although impurities attributable to the decomposition of starting monomers may be, as a matter of course, produced during the polymerization, the amount thereof is generally very small. If such decomposition products are produced in a large amount, the polymerization conditions are improper.

The target impurities (impurities having a boiling point of from 150 to 300° C. under ordinary pressure and SP of from 8 to 16) are difficult to remove from polyamide resins under non-molten state. When polyamide resins are melted in the molding/processing steps, the target impurities are separated from the molten resins to cause the inconveniences mentioned above. Therefore, if starting monomers contaminated with the target impurities are used for the production of polyamide resins without preliminary reduction of the content thereof, the target impurities should be removed in the resin production step. However, in the conventional techniques, the removal of the target impurities is not considered when determining the polymerization conditions.

An aqueous nylon salt solution is generally used as a feedstock for the production of polyamides. The aqueous nylon salt solution is first heated under pressure to conduct the polymerization reaction in a homogeneous phase while suppressing the distillation of diamine. After fixing the diamine, the pressure of the reaction system is gradually reduced by releasing water vapor, and the polymerization reaction is finally completed under ordinary pressure or reduced pressure. In the above process, the nylon salt is preferably isolated and purified to remove impurities. Also, there is known a process in which a nylon salt is used as a feedstock (Japanese Patent Publication Nos. 33-15700 and 43-22874). Since the isolation and purification of the nylon salt considerably increase the production costs, this process is preferably conducted using a polymerizer capable of providing a high surface renewal and maintaining a high vacuum condition in a later stage of the polymerization.

As polymerization methods using neither the nylon salt nor the aqueous nylon salt solution as a feedstock, there are known a method in which a diamine containing a small amount of water is dropped into a dicarboxylic acid at a temperature of 220° C. or lower under ordinary pressure (Japanese Patent Application Laid-Open No. 48-12390); and a method in which a diamine is dropped into a molten dicarboxylic acid under ordinary pressure to conduct direct reaction (Japanese Patent Application Laid-Open Nos. 57-200420, 58-111829, etc.). Since these methods do not include the formation of nylon salts, the target impurities should be removed in the later polymerization stage while maintaining the molten state under reduced pressure. However, since a sufficient surface renewal in the reactor is not achieved in these methods, it is extremely difficult to remove the target impurities. Therefore, it is desirable to use a diamine containing the impurities excluding water in an amount of 0.10% by weight or lower, or use a polymerizer capable of providing a high surface renewal and maintaining a high vacuum condition in an intermediate or later polymerization stage.

Examples of the polymerizer suitably used in the intermediate or later polymerization stage include a centrifugal thin film evaporator (Japanese Patent Publication No. 50-9834, Japanese Patent Application Laid-Open No. 2000-256461, etc.), a single-screw vented extruder, a self-cleaning twin-screw vented extruder (Japanese Patent Publication Nos. 50-15275 and 5-82410, Japanese Patent Application Laid-Open No. 62-79225, etc.), a horizontal continuous polymerizer of a cylindrical shape with no screw, which is equipped with one horizontal rotation shaft or two or more parallel horizontal rotation shafts each having a plurality of agitation blades that are fitted substantially perpendicularly to the shafts and arranged in a discontinuous manner (Japanese Patent Application Laid-Open No. 48-84781, Japanese Patent Publication Nos. 50-21514 and 53-15753, Japanese Patent Application Laid-open Nos. 51-31792, 10-259242, 11-130 and 2000-212265, etc.). These polymerizers are extremely effective to reduce the content of the target impurities.

In the melt polymerization conducted using such a polymerizer capable of providing a high surface renewal and maintaining a high vacuum condition while reducing the content of the target impurities, the reaction system is preferably maintained at a pressure of 80 kPa or lower for at least for 2 min when the polymerization degree of polyamide reaches at least 20. When the polymerization degree is less than 20, the fixation of the diamine component is insufficient and a good mole balance between the diamine component and the dicarboxylic acid component cannot be obtained. Even though maintained at a pressure exceeding 80 kPa, the target impurities cannot be sufficiently distilled away, thereby failing to efficiently reduce the content of the target impurities.

The resin temperature in the polymerizer at the intermediate or later polymerization stage is regulated within the temperature range, preferably from melting point +5° C. to lower than melting point +40° C., more preferably from melting point +10° C. to lower than melting point +35° C. If the resin temperature is less than melting point +5° C., the resins may be solidified in the polymerizer, and it becomes difficult to form a thin film state sufficient for removing the target impurities because of increased melt viscosity. Although a resin temperature of melting point +40° C. or higher is advantageous for reducing the content of the target impurities, there may occur abnormal reactions such as decomposition, three-dimensional cross-linking and gelation, resulting in considerably deteriorated quality of the resulting polyamide resins. In the present invention, the melting point of polyamide resins means an endothermic peak temperature attributable to the heat of fusion of crystals as measured by differential scanning calorimetry (DSC). When the polyamide resins are not crystallizable, i.e., are less crystallizable or amorphous, the melting point is expressed by a flow initiation temperature.

The residence time in the polymerizer at the intermediate or later polymerization stage is preferably 2 min or more but less than 120 min, more preferably 5 min or more but less than 60 min. Since the substantial portion of the target impurities is distilled away within 120-min residence, a residence time exceeding 120 min only increases the abnormal reactions such as decomposition, three-dimensional cross-linking and gelation to deteriorate the quality of the resulting polyamide resins. If the residence time is less than 2 min, the impurities cannot be sufficiently distilled away, and the polymerization degree does not reach a sufficient level in the later polymerization stage.

The target impurities include various compounds depending upon the resulting polyamide resins and starting monomers used. For example, when the resulting polyamide resin is poly(m-xylylene adipamide), the target impurities may include phenol, benzyl alcohol, m-tolunitrile, 3-methylbenzyl alcohol, 3-cyanobenzyl alcohol, isophthalonitrile, 2,4-dimethylbenzyl alcohol, 2,5-dimethylbenzyl alcohol, 3,4-dimethylbenzyl alcohol, 3,5-dimethylbenzyl alcohol, 3,5-dimethylbenzaldehyde, 3-cyanobenzaldehyde, hexanol, trimethylphenol, and cyclopentanone. When the resulting polyamide resin is poly(1,3-bisaminomethylcyclohexylilene adipamide), the target impurities may include phenol, benzyl alcohol, m-tolunitrile, 3-methylbenzyl alcohol, 3-cyanobenzyl alcohol, isophthalonitrile, 2,4-dimethylbenzyl alcohol, 2,5-dimethylbenzyl alcohol, 3,4-dimethylbenzyl alcohol, 3,5-dimethylbenzyl alcohol, 3,5-dimethylbenzaldehyde, 3-cyanobenzaldehyde, hexanol, trimethylphenol, cyclopentanone, 3-methyl-1-aminomethylcyclohexane, 2,4-dimethylcyclohexylmethanol, 2,5-dimethylcyclohexylmethanol, 3,4-dimethylcyclohexylmethanol and 3,5-dimethylcyclohexylmethanol.

The content of the target impurities is desirable as small as possible, and preferably 0.3% by weight or less, more preferably 0.15% by weight or less, still more preferably 0.10% by weight or less, each based on the amount of polyamide resin. If the content exceeds 0.3% by weight, the target impurities separated from polyamide resin frequently cause the inconveniences mentioned above in the molding/processing steps.

The identification and quantitative determination of the target impurities may be conducted by a method comprising extracting polyamide resins with a suitable solvent, filtering the resultant extract and analyzing the filtered extract by gas chromatography. The solvent used for the extraction is preferably composed of two or more kinds of solvents having different SP values, for example, an alcohol/hydrocarbon mixed solvent and an alcohol/ketone mixed solvent, so as to allow the impurities having SP of from 8 to 16 to be sufficiently dissolved therein. Also, the polyamide resins are preferably powdered to facilitate the extraction procedure.

The polyamide resins of the present invention have the following advantages and effects.

(1) Defects such as molding defects and appearance defects can be reduced in the applications for molding materials bottles, sheets, films and fibers to decrease the production of defective moldings, thereby increasing the productivity.

(2) Since impurities to be removed in the production of the starting monomers are predetermined, the efficient purification conditions can be selected.

(3) Since burning of die, contamination of cooling rolls, etc. can be avoided in the continuous production process such as extrusion, the process can be continued in a prolonged period of time.

(4) Since contamination of die, burning of nozzle, etc. can be avoided in injection molding, the process can be continued in a prolonged period of time.

(5) Yellowing of polyamide resins during melt molding and with time can be prevented.

The present invention will be described in more detail below by referring to the following examples and comparative examples. The measurements for evaluation were conducted by the following methods.

(1) Relative Viscosity of Polyamide Resin

Accurately weighed 1 g polyamide resin was completely dissolved in 100 cc of 96% sulfuric acid at 20 to 30° C. under stirring. Then, 5 cc of the solution was immediately transferred into a Cannon-Fenske viscometer. After allowing to stand in a thermostatic chamber maintained at 25±0.03° C. for 10 min, the falling time (t) was measured. Separately, the falling time ($t_0$) of the 96% sulfuric acid itself was similarly measured. The relative viscosity was calculated from the measured falling times t and to according $t_0$ the following equation A:

$$\text{Relative Viscosity} = (t/t_0) \quad (A)$$

(2) Content of Impurities in Polyamide Resin

About 10 g of freeze-pulverized 500-$\mu$m mesh pass/250-$\mu$m mesh on polyamide resin powder was accurately weighed and successively extracted under boiling with 100 cc of methanol, 100 cc of acetone and 100 cc of ethyl ether for 3 h for each. The extracts were filtered and then analyzed by gas chromatography.

Gas Chromatograph: HP589.0A
Column: MEGABORE DB5 (30 m×0.55 mm×1.5 $\mu$m)
Temperature rise program: 40° C.→300° C. (held for 5 min), 10° C./min
Helium Flow Rate: 10 cc/min
Injection Temperature: 300° C.
Detector: FID
Detector Temperature: 300° C.

In this analysis, oligomers, etc., extracted from the polyamide resin were detected in addition to the impurities, but readily distinguished therefrom.

(3) Unevenness of Thickness of Non-stretched Film

The thickness of a non-stretched film was measured at 100 points along a center portion at 10 cm intervals. The unevenness of thickness was calculated from the following equation:

Unevenness of Thickness (%)=[(average thickness)−(minimum thickness)]/(average thickness)×100

(4) Tensile Strength of Non-Stretched Film

The tensile strength of a non-stretched film of 10 mm wide and 100 mm long was measured according to ASTM D882 using a strograph "V1-C" available from Toyo Seiki Co., Ltd.

(5) Yellowness of Non-Stretched Film

The tristimulus values X, Y and Z of XYZ colorimetric system of reflected light were measured according to JIS- K7103 using a color difference meter Σ80 model available from Nippon Denshoku Co., Ltd., and the yellowness index (YI) was calculated from the following formula:

$$YI = 100 \times (1.28X - 1.06Z)/Y$$

COMPARATIVE EXAMPLE 1

A. Preparation of Polyamide Resin

In a reactor equipped with a stirrer and a partial condenser, adipic acid (water content: 0.15 wt %; purity: 99.85 wt %) was melted and heated to 180° C. Then, m-xylylenediamine (MXDA) with a purity of 99.14 wt % was dropped to the molten adipic acid while raising the temperature under ordinary pressure. When the temperature of the mixture reached 250° C., the dropping of MXDA was stopped. After the temperature reached 255° C., the pressure was maintained at 60 kPa, and the temperature was further increased to 260° C. over 20 min. Thereafter, the reaction mixture was taken out of the reactor, water-cooled and then granulated to obtain poly(m-xylylene adipamide) (nylon MXD6) having a mole balance (diamine/dicarboxylic acid) of 0.996 and a relative viscosity of 2.22.

The thus obtained poly(m-xylylene adipamide) was vacuum-dried at 120° C. for 6 h, and then analyzed. It was confirmed that the poly(m-xylylene adipamide) contained, as the target impurities (impurities having a boiling point of from 150 to 300° C. under ordinary pressure and a SP of from 8 to 16), phenol, benzyl alcohol, m-tolunitrile, 3-methylbenzyl alcohol, 3-cyanobenzyl alcohol, isophthalonitrile, dimethylbenzyl alcohol, etc. in a total amount of 0.46% by weight.

B. Continuous Extrusion

After drying at 120° C. for 6 h, the polyamide resin was extruded at 260° C. from a 40 mmφ extruder into a 150 μm thick non-stretched film. Tar-like resins adhered to the extruder die, and the non-stretched film was seriously contaminated with the tar-like resins. The cooling rolls were also severely contaminated, resulting in contamination of the non-stretched film. Therefore, the cooling rolls had to be washed by methanol every five hours to continue the extrusion. The unevenness of thickness and strength of the non-stretched film are shown in Table 1.

C. Yellowness of Non-Stretched Film

The non-stretched film was fixedly mounted on a frame and placed in a thermostatic chamber, where the film was allowed to stand in air at 150° C. for one hour to subject the film to crystallization and heat treatment. The yellowness index (YI) based on reflected light was measured. The results are shown in Table 1.

EXAMPLE 1

A. Preparation of Polyamide Resin

In a reactor of the same type as used in Comparative Example 1, adipic acid (water content: 0.15 wt %; purity: 99.85 wt %) was melted and heated to 180° C. Then, MXDA with a purity of 99.58 wt %, which had been prepared by purifying MXDA used in Comparative Example 1, was dropped to the molten adipic acid while raising the temperature under ordinary pressure. When the temperature of the mixture reached 250° C., the dropping of MXDA was stopped. After the temperature reached 255° C., the pressure was maintained at 60 kPa, and the temperature was further increased to 260° C. over 20 min. Thereafter, the reaction mixture was taken out of the reactor, water-cooled and then granulated to obtain poly(m-xylylene adipamide) (nylon MXD6) having a mole balance (diamine/dicarboxylic acid) of 0.995 and a relative viscosity of 2.18.

The thus obtained poly(m-xylylene adipamide) was vacuum-dried at 120° C. for 6 h, and then analyzed. It was confirmed that the poly(m-xylylene adipamide) contained, as the target impurities, m-tolunitrile, 3-methylbenzyl alcohol, 3-cyanobenzyl alcohol, dimethylbenzyl alcohol, etc. in a total amount of 0.30% by weight.

B. Continuous Extrusion

The polyamide resin was continuously extruded into a 150 μm thick non-stretched film for two days in the same manner as in Comparative Example 1. Although the extruder die was slightly contaminated with tar-like resins, no adhesion of the tar-like resins onto the non-stretched film was observed. In addition, the cooling rolls were not contaminated to such an extent that inhibited the continuous extrusion. The unevenness of thickness and strength of the non-stretched film are shown in Table 1.

C. Yellowness of Non-Stretched Film

After heat-treating in the same manner as in Comparative Example 1, the yellowness index (YI) of the non-stretched film was measured. The results are shown in Table 1.

EXAMPLE 2

A. Preparation of Polyamide Resin

In a reactor of the same type as used in Comparative Example 1, adipic acid (water content: 0.15 wt %; purity: 99.85 wt %) was melted and heated to 180° C. Then, MXDA with a purity of 99.83 wt %, which had been prepared by purifying MXDA used in Comparative Example 1, was dropped to the molten adipic acid while raising the temperature under ordinary pressure. When the temperature of the mixture reached 250° C., the dropping of MXDA was stopped. After the temperature reached 255° C., the pressure was maintained at 60 kPa, and the temperature was further increased to 260° C. over 20 min. Thereafter, the reaction mixture was taken out of the reactor, water-cooled and then granulated to obtain poly(m-xylylene adipamide) (nylon MXD6) having a mole balance (diamine/dicarboxylic acid) of 0.996 and a relative viscosity of 2.20.

The thus obtained poly(m-xylylene adipamide) was vacuum-dried at 120° C. for 6 h, and then analyzed. It was confirmed that the poly(m-xylylene adipamide) contained, as the target impurities, m-tolunitrile, 3-methylbenzyl alcohol, 3-cyanobenzyl alcohol, dimethylbenzyl alcohol, etc. in a total amount of 0.15% by weight.

B. Continuous Extrusion

The polyamide resin was continuously extruded into a 150 μm thick non-stretched film for two days in the same manner as in Comparative Example 1. No inconveniences, such as burning of die and contamination of cooling rolls, which might inhibit the continuous extrusion were observed. The unevenness of thickness and strength of the non-stretched film are shown in Table 1.

C. Yellowness of Non-stretched Film

After heat-treating in the same manner as in Comparative Example 1, the yellowness index (YI) of the non-stretched film was measured. The results are shown in Table 1.

EXAMPLE 3

A. Preparation of Polyamide Resin

In a reactor of the same type as used in Comparative Example 1, adipic acid (water content: 0.15 wt %; purity: 99.85 wt %) was melted and heated to 180° C. Then, MXDA with a purity of 99.98 wt %, which had been prepared by purifying MXDA used in Comparative Example 1, was dropped to the molten adipic acid while raising the temperature under ordinary pressure. When the temperature of the mixture reached 250° C., the dropping of MXDA was stopped. After the temperature reached 255° C., the pressure was maintained at 60 kPa, and the temperature was further increased to 260° C. over 20 min. Thereafter, the reaction mixture was taken out of the reactor, water-cooled and then granulated to obtain poly(m-xylylene adipamide) (nylon MXD6) having a mole balance (diamine/dicarboxylic acid) of 0.994 and a relative viscosity of 2.15.

The thus obtained poly(m-xylylene adipamide) was vacuum-dried at 120° C. for 6 h, and then analyzed. It was confirmed that the poly(m-xylylene adipamide) contained, as the target impurities, m-tolunitrile, 3-methylbenzyl alcohol, 3-cyanobenzyl alcohol, etc. in a total amount of 0.06% by weight.

B. Continuous Extrusion

The polyamide resin was continuously extruded into a 150 μm thick non-stretched film for two days in the same manner as in Comparative Example 1. No inconveniences, such as burning of die and contamination of cooling rolls, which might inhibit the continuous extrusion were observed. The unevenness of thickness and strength of the non-stretched film are shown in Table 1.

C. Yellowness of Non-Stretched Film

After heat-treating in the same manner as in Comparative Example 1, the yellowness index (YI) of the non-stretched film was measured. The results are shown in Table 1.

COMPARATIVE EXAMPLE 2

A. Preparation of Polyamide Resin

In a reactor of the same type as used in Comparative Example 1, adipic acid (water content: 0.15 wt %; purity: 99.85 wt %) was melted and heated to 180° C. Then, the diamine mixture of MXDA with a purity of 99.14 wt % used in Comparative Example 1 and 1,3-bisaminomethylcyclohexane (1,3-BAC) with a purity of 99.05 wt % was dropped to the molten adipic acid while raising the temperature under ordinary pressure. When the temperature of mixture reached 250° C., the dropping of diamine mixture was stopped. After the temperature reached 255° C., the pressure was maintained at 60 kPa, and the temperature was further increased to 260° C. over 20 min. Thereafter, the reaction mixture was taken out of the reactor, water-cooled and then granulated to obtain poly(m-xylylene-co-1,3-bisaminomethylcyclohexylilene adipamide) (nylon-MXD-co-1,3-BAC6) having a mole balance (diamine/dicarboxylic acid) of 0.994 and a relative viscosity of 2.18.

The thus obtained poly(m-xylylene-co-1,3-bisaminomethylcyclohexylilene adipamide) was vacuum-dried at 120° C. for 6 h, and then analyzed. It was confirmed that the poly(m-xylylene-co-1,3-bisaminomethylcyclohexylilene adipamide) contained, as the target impurities, phenol, benzyl alcohol, m-tolunitrile, 3-methylbenzyl alcohol, 3-cyanobenzyl alcohol, isophthalonitrile, dimethylbenzyl alcohol, 3-methyl-1-aminomethylcyclohexane, dimethylcyclohexylmethanol, etc. in a total amount of 0.56% by weight.

B. Continuous Extrusion

The polyamide resin was continuously extruded into a 150 μm thick non-stretched film for two days in the same manner as in Comparative Example 1. Tar-like resins adhered to the extruder die, and the non-stretched film was seriously contaminated with the tar-like resins. The cooling rolls were also severely contaminated, resulting in contamination of the non-stretched film. Therefore, the cooling rolls had to be washed by methanol every five hours to continue the extrusion. The unevenness of the thickness and strength of the non-stretched film are shown in Table 2.

C. Yellowness of Non-Stretched Film

After heat-treating in the same manner as in Comparative Example 1, the yellowness index (YI) of the non-stretched film was measured. The results are shown in Table 2.

EXAMPLE 4

A. Preparation of Polyamide Resin

In a reactor of the same type as used in Comparative Example 1, adipic acid (water content: 0.15 wt %; purity: 99.85 wt %) was melted and heated to 180° C. Then, the diamine mixture of MXDA with a purity of 99.98 wt % and 1,3-BAC with a purity of 99.98 wt %, which had been prepared by purifying MXDA and 1,3-BAC used in Comparative Example 2, was dropped to the molten adipic acid while raising the temperature under ordinary pressure. When the temperature of the mixture reached 250° C., the dropping of diamine mixture was stopped. After the temperature reached 255° C., the pressure was maintained at 60 kPa, and the temperature was further increased to 260° C. over 20 min. Thereafter, the reaction mixture was taken out of the reactor, water-cooled and then granulated to obtain poly(m-xylylene-co-1,3-bisaminomethylcyclohexylilene adipamide) (nylon-MXD-co-1,3-BAC6) having a mole balance (diamine/dicarboxylic acid) of 0.995 and a relative viscosity of 2.20.

The thus obtained poly(m-xylylene-co-1,3-bisaminomethylcyclohexylilene adipamide) was vacuum-dried at 120° C. for 6 h, and then analyzed. It was confirmed that the poly(m-xylylene-co-1,3-bisaminomethylcyclohexylilene adipamide) contained, as the target impurities, m-tolunitrile, 3-methylbenzyl alcohol, 3-cyanobenzyl alcohol, 3-methyl-1-aminomethylcyclohexane, etc. in a total amount of 0.08% by weight.

B. Continuous Extrusion

The polyamide resin was continuously extruded into a 150 μm thick non-stretched film for two days in the same manner as in Comparative Example 1. No inconveniences, such as burning of die and contamination of cooling rolls, which might inhibit the continuous extrusion were observed. The unevenness of the thickness and strength of the non-stretched film are shown in Table 2.

C. Yellowness of Non-Stretched film

After heat-treating in the same manner as in Comparative Example 1, the yellowness index (YI) of the non-stretched film was measured. The results are shown in Table 2.

COMPARATIVE EXAMPLE 3

A. Preparation of Polyamide Resin In a reactor of the same type as used in Comparative Example 1, adipic acid (water content: 0.15 wt %; purity: 99.85 wt %) was melted and heated to 180° C. Then, 1,3-bisaminomethylcyclohexane (1,3-BAC) with a purity of 99.05 wt % was dropped to the molten adipic acid while raising the temperature under ordinary pressure. When the temperature of mixture reached 250° C., the dropping of 1,3-BAC was stopped. After the temperature reached 255° C., the pressure was maintained at 60 kPa, and the temperature was further increased to 260° C. over 20 min. Thereafter, the reaction mixture was taken out of the reactor, water-cooled and then granulated to obtain poly(1,3-bisaminomethylcyclohexylilene adipamide) (nylon 1,3-BAC6) having a mole balance (diamine/dicarboxylic acid) of 0.994 and a relative viscosity of 2.18.

The thus obtained poly(1,3-bisaminomethylcyclohexylilene adipamide) was vacuum-dried at 120° C. for 6 h, and then analyzed. It was confirmed that the poly(1,3-bisaminomethylcyclohexylilene adipamide) contained, as the target impurities, phenol, benzyl alcohol, m-tolunitrile, 3-methylbenzyl alcohol, 3-cyanobenzyl alcohol, isophthalonitrile, dimethylbenzyl alcohol, 3-methyl-1-aminomethylcyclohexane, dimethylcyclohexylmethanol, etc. in a total amount of 0.51% by weight.

B. Continuous Extrusion

The polyamide resin was continuously extruded into a 150 μm thick non-stretched film for two days in the same manner as in Comparative Example 1. Tar-like resins adhered to the extruder die, and the non-stretched film was seriously contaminated with the tar-like resins. The cooling rolls were also severely contaminated, resulting in contamination of the non-stretched film. Therefore, the cooling rolls had to be washed by methanol every five hours to continue the extrusion. The unevenness of the thickness and strength of the non-stretched film are shown in Table 2.

C. Yellowness of Non-stretched Film

After heat-treating in the same manner as in Comparative Example 1, the yellowness index (YI) of the non-stretched film was measured. The results are shown in Table 2.

EXAMPLE 5

A. Preparation of Polyamide Resin

In a reactor of the same type as used in Comparative Example 1, adipic acid (water content: 0.15 wt %; purity: 99.85 wt %) was melted and heated to 180° C. Then, 1,3-BAC with a purity of 99.98 wt %, which had been prepared by purifying 1,3-BAC used in Comparative Example 3, was dropped to the molten adipic acid while raising the temperature under ordinary pressure. When the temperature of the mixture reached 250° C., the dropping of 1,3-BAC was stopped. After the temperature reached 255° C., the pressure was maintained at 60 kPa, and the temperature was further increased to 260° C. over 20 min. Thereafter, the reaction mixture was taken out of the reactor, water-cooled and then granulated to obtain poly(1,3-bisaminomethylcyclohexylilene adipamide) (nylon 1,3-BAC6) having a mole balance (diamine/dicarboxylic acid) of 0.995 and a relative viscosity of 2.16.

The thus obtained poly(1,3-bisaminomethylcyclohexylilene adipamide) was vacuum-dried at 120° C. for 6 h, and then analyzed. It was confirmed that the poly(1,3-bisaminomethylcyclohexylilene adipamide) contained, as the target impurities, 3-methylbenzyl alcohol, 3-cyanobenzyl alcohol, 3-methyl-1-aminomethylcyclohexane, etc. in a total amount of 0.07% by weight.

B. Continuous Extrusion

The polyamide resin was continuously extruded into a 150 μm thick non-stretched film for two days in the same manner as in Comparative Example 1. No inconveniences, such as burning of die and contamination of cooling rolls, which might inhibit the continuous extrusion were observed. The unevenness of the thickness and strength of the non-stretched film are shown in Table 2.

C. Yellowness of Non-stretched film

After heat-treating in the same manner as in Comparative Example 1, the yellowness index (YI) of the non-stretched film was measured. The results are shown in Table 2.

EXAMPLE 6

A. Preparation of Polyamide Resin

In a reactor of the same type as used in Comparative Example 1, adipic acid (water content: 0.15 wt %; purity: 99.85 wt %) was melted and heated to 180° C. Then, MXDA with a purity of 99.14 wt % used in Comparative Example 1 was dropped to the molten adipic acid while raising the temperature under ordinary pressure. When the temperature of the mixture reached 250° C., the dropping of MXDA was stopped. When the temperature reached 252° C., the mixture of the reactor were transferred into a horizontal continuous polymerizer of a cylindrical shape. The polymerizer had no screw portion, but was equipped with two or more parallel horizontal rotation shafts each having a plurality of agitation blades which were fitted substantially perpendicular to each shaft and arranged in a discontinuous manner. The mixture was heat-treated in the polymerizer at 260° C. under 1 kPa for 10 min, taken out of the polymerizer, water-cooled and then granulated to obtain poly(m-xylylene adipamide) (nylon MXD6) having a mole balance (diamine/dicarboxylic acid) of 0.992 and a relative viscosity of 2.31.

The thus obtained poly(m-xylylene adipamide) was vacuum-dried at 120° C. for 6 h, and then analyzed. It was confirmed that the poly(m-xylylene adipamide) contained, as the target impurities, m-tolunitrile, 3-methylbenzyl alcohol, 3-cyanobenzyl alcohol, isophthalonitrile, dimethylbenzyl alcohol, etc. in a total amount of 0.25% by weight.

B. Continuous Extrusion

The polyamide resin was continuously extruded into a 150 μm thick non-stretched film for two days in the same manner as in Comparative Example 1. Although the extruder die was slightly contaminated with tar-like resins, no adhesion of the tar-like resins onto the non-stretched film was observed. In addition, the cooling rolls were not contaminated to such an extent that inhibited the continuous extrusion. The unevenness of thickness and strength of the non-stretched film are shown in Table 3.

C. Yellowness of Non-stretched Film

After heat-treating in the same manner as in Comparative Example 1, the yellowness index (YI) of the non-stretched film was measured. The results are shown in Table 3.

COMPARATIVE EXAMPLE 4

A. Preparation of Polyamide Resin

In a reactor of the same type as used in Comparative Example 1, adipic acid (water content: 0.15 wt %; purity: 99.85 wt %) was melted and heated to 180° C. Then, MXDA with a purity of 95.28 wt % was dropped to the molten adipic acid while raising the temperature under ordinary pressure. When the temperature of the mixture reached 250° C., the dropping of MXDA was stopped. When the temperature reached 252° C., the mixture of the reactor were transferred into a horizontal continuous polymerizer of the same type as used in Example 6. The mixture was heat-treated in the polymerizer at 260° C. under 1 kPa for 10 min, taken out of the polymerizer, water-cooled and then granulated to obtain poly(m-xylylene adipamide) (nylon MXD6) having a mole balance (diamine/dicarboxylic acid) of 0.991 and a relative viscosity of 2.11.

The thus obtained poly(m-xylylene adipamide) was vacuum-dried at 120° C. for 6 h, and then analyzed. It was confirmed that the poly(m-xylylene adipamide) contained, as the target impurities, m-tolunitrile, 3-methylbenzyl alcohol, 3-cyanobenzyl alcohol, isophthalonitrile, dimethylbenzyl alcohol, etc. in a total amount of 0.70% by weight.

B. Continuous Extrusion

The polyamide resin was continuously extruded into a 150 μm thick non-stretched film for two days in the same manner as in Comparative Example 1. Tar-like resins adhered to the extruder die, and the non-stretched film was seriously contaminated with the tar-like resins. The cooling rolls were also severely contaminated, resulting in contamination of the non-stretched film. Therefore, the cooling rolls had to be washed by methanol every three hours to continue the extrusion. The unevenness of thickness and strength of the non-stretched film are shown in Table 3.

C. Yellowness of Unstretched Film

After heat-treating in the same manner as in Comparative Example 1, the yellowness index (YI) of the non-stretched film was measured. The results are shown in Table 3.

EXAMPLE 7

A. Preparation of Polyamide Resin

In a reactor of the same type as used in Comparative Example 1, adipic acid (water content: 0.15 wt %; purity: 99.85 wt %) was melted and heated to 180° C. Then, 1,3-BAC with a purity of 99.05 wt % used in Comparative Example 3 was dropped to the molten adipic acid while raising the temperature under ordinary pressure. When the temperature of the mixture reached 250° C., the dropping of 1,3-BAC was stopped. When the temperature reached 252° C., the mixture of the reactor were transferred into a horizontal continuous polymerizer of the same type as used in Example 6. The mixture was heat-treated in the polymerizer at 260° C. under 1 kPa for 10 min, taken out of the polymerizer, water-cooled and then granulated to obtain poly(1,3-bisaminomethylcyclohexylilene adipamide) (nylon 1,3-BAC6) having a mole balance (diamine/dicarboxylic acid) of 0.993 and a relative viscosity of 2.33.

The thus obtained poly(1,3-bisaminomethylcyclohexylilene adipamide) was vacuum-dried at 120° C. for 6 h, and then analyzed. It was confirmed that the poly(1,3-bisaminomethylcyclohexylilene adipamide) contained, as the target impurities, 3-methylbenzyl alcohol, 3-cyanobenzyl alcohol, 3-methyl-1-aminomethylcyclohexane, etc. in a total amount of 0.25% by weight.

B. Continuous Extrusion

The polyamide resin was continuously extruded into a 150 μm thick non-stretched film for two days in the same manner as in Comparative Example 1. Although the extruder die was slightly contaminated with tar-like resins, no adhesion of the tar-like resins onto the non-stretched film was observed. In addition, the cooling rolls were not contaminated to such an extent that inhibited the continuous extrusion. The unevenness of the thickness and strength of the non-stretched film are shown in Table 3. C. Yellowness of Non-stretched Film After heat-treating in the same manner as in Comparative Example 1, the yellowness index (YI) of the non-stretched film was measured. The results are shown in Table 3.

COMPARATIVE EXAMPLE 5

A. Preparation of Polyamide Resin

In a reactor of the same type as used in Comparative Example 1, adipic acid (water content: 0.15 wt %; purity: 99.85 wt %) was melted and heated to 180° C. Then, 1,3-BAC with a purity of 95.02 wt % was dropped to the molten adipic acid while raising the temperature under ordinary pressure. When the temperature of the mixture reached 250° C., the dropping of 1,3-BAC was stopped. When the temperature reached 252° C., the mixture of the reactor were transferred into a horizontal continuous polymerizer of the same type as used in Example 6. The mixture was heat-treated in the polymerizer at 260° C. under 1 kPa for 10 min, taken out of the polymerizer, water-cooled and then granulated to obtain poly(1,3-bisaminomethylcyclohexylilene adipamide) (nylon 1,3-BA C6) having a mole balance (diamine/dicarboxylic acid) of 0.993 and a relative viscosity of 2.18.

The thus obtained poly(1,3-bisaminomethylcyclohexylilene adipamide) was vacuum-dried at 120° C. for 6 h, and then analyzed. It was confirmed that the poly(1,3-bisaminomethylcyclohexylilene adipamide) contained, as the target impurities, m-tolunitrile, 3-methylbenzyl alcohol, 3-cyanobenzyl alcohol, isophthalonitrile, dimethylbenzyl alcohol, 3-methyl-1-aminomethylcyclohexane, dimethylcyclohexylmethanol, etc. in a total amount of 0.75% by weight.

B. Continuous Extrusion

The polyamide resin was continuously extruded into a 150 μm thick non-stretched film for two days in the same manner as in Comparative Example 1. Tar-like resins adhered to the extruder die, and the non-stretched film was seriously contaminated with the tar-like resins. The cooling rolls were also severely contaminated, resulting in contamination of the non-stretched film. Therefore, the cooling rolls had to be washed by methanol every three hours to continue the extrusion. The unevenness of the thickness and strength of the non-stretched film are shown in Table 3.

C. Yellowness of Non-stretched film

After heat-treating in the same manner as in Comparative Example 1, the yellowness index (YI) of the non-stretched film was measured. The results are shown in Table 3.

TABLE 1

|  | Com. Ex. 1 | Ex. 1 | Ex. 2 | Ex. 3 |
|---|---|---|---|---|
| Purity of MXDA (wt %) | 99.14 | 99.58 | 99.83 | 99.98 |
| Amount of Impurities* (wt %) | 0.46 | 0.30 | 0.15 | 0.06 |
| Measurement on Non-stretched Film |  |  |  |  |
| Unevenness of Thickness (%) | 4.9 | 2.9 | 2.4 | 2.1 |
| Strength (kgf/mm$^2$) | 6.2 | 8.1 | 8.6 | 8.7 |
| Yellowness Index | 9.9 | 6.8 | 6.0 | 6.1 |

*Total amount of impurities having a boiling point of from 150 to 300° C. and SP of from 8 to 16 based on the weight of the polyamide resin.

TABLE 2

|  | Com. Ex. 2 | Ex. 4 | Com. Ex. 3 | Ex. 5 |
|---|---|---|---|---|
| Purity of MXDA (wt %) | 99.14 | 99.98 | — | — |
| Purity of 1,3-BAC (wt %) | 99.05 | 99.98 | 99.05 | 99.98 |
| Blend ratio(MXDA/1,3-BAC) | 50/50 | 50/50 | — | — |
| Amount of Impurities* (wt %) | 0.56 | 0.08 | 0.51 | 0.07 |
| Measurement on Non-stretched Film |  |  |  |  |
| Unevenness of Thickness (%) | 5.7 | 2.9 | 5.4 | 2.2 |
| Strength (kgf/mm$^2$) | 5.2 | 8.5 | 5.6 | 8.4 |
| Yellowness Index | 10.4 | 6.4 | 10.1 | 6.3 |

*Total amount of impurities having a boiling point of from 150 to 300° C. and SP of from 8 to 16 based on the weight of the polyamide resin.

TABLE 3

|  | Ex. 6 | Com. Ex. 4 | Ex. 7 | Com. Ex. 5 |
|---|---|---|---|---|
| Purity of MXDA (wt %) | 99.14 | 95.28 | — | — |
| Purity of 1,3-BAC (wt %) | — | — | 99.05 | 95.02 |
| Amount of Impurities* (wt %) | 0.25 | 0.70 | 0.25 | 0.75 |
| Measurement on Non-stretched Film |  |  |  |  |
| Unevenness of Thickness (%) | 2.1 | 9.4 | 2.1 | 9.4 |
| Strength (kgf/mm$^2$) | 8.4 | 5.8 | 8.4 | 5.9 |
| Yellowness Index | 6.7 | 11.0 | 6.9 | 12.4 |

*Total amount of impurities having a boiling point of from 150 to 300° C. and SP of from 8 to 16 based on the weight of the polyamide resin.

As seen from Tables 1 to 3, the films produced from the polyamide resins containing the target impurities (impurities having a boiling point of from 150 to 300° C. and a SP of from 8 to 16) in a total amount of 0.3% by weight or less based on the weight of the polyamide resin were small in the unevenness of thickness, less deteriorated in the strength, and low in yellowing even after the heat treatment.

Although the present invention has been described above with reference to the preferred examples, it should be noted that these examples are not intended to limit the scope of the invention thereto. Also, it is to be understood that the conditions, methods and apparatuses for the production of polyamide resins as described in the examples are merely illustrative, and modifications and variations may be made appropriately within the scope of the present invention.

What is claimed is:

1. A polyamide resin produced by the polycondensation of a dicarboxylic acid component and a diamine component containing xylylenediamine and bisaminomethylcyclohexane in a total amount of 70 mol % or higher, wherein a total content of impurities having a boiling point of from 150 to 300° C. under ordinary pressure and a solubility parameter of from 8 to 16 is 0.3% by weight or lower based on the weight of the polyamide resin.

2. The polyamide resin according to claim 1, wherein said impurities include aromatic and alicyclic alcohols, aromatic and alicyclic aldehydes and aromatic and alicyclic nitriles.

3. The polyamide resin according to claim 2, wherein said aromatic and alicyclic alcohols include benzyl alcohol, cyclohexylmethanol and their derivatives.

4. The polyamide resin according to claim 1, wherein 70 mol % or higher of said xylylenediamine is m-xylylenediamine.

5. The polyamide resin according to claim 1, wherein 70 mol % or higher of said bisaminomethylcyclohexane is 1,3-bisaminomethylcyclohexane.

6. The polyamide resin according to claim 1, wherein 70 mol % or higher of said dicarboxylic acid component is adipic acid.

7. A process for producing the polyamide resin according to claim 1, comprising melt-polymerizing a dicarboxylic acid component with a diamine component containing xylylenediamine and bisaminomethylcyclohexane in a total amount of 70 mol % or higher, said diamine containing impurities other than water in an amount of 0.10% by weight or lower.

8. A process for producing the polyamide resin according to claim 1, comprising melt-polymerizing a dicarboxylic acid component with a diamine component containing xylylenediamine and bisaminomethylcyclohexane in a total amount of 70 mol % or higher, wherein a reaction system of the melt polymerization is kept at 80 kPa or lower for at least two minutes after an average polymerization degree reaches at least 20.

9. The polyamide resin according to claim 1, wherein said total content of said impurities is 0.15% by weight or less.

10. The polyamide resin according to claim 9, wherein said total content of said impurities is 0.10% by weight or less.

11. The process according to claim 7, including the further step of purifying the diamine component to contain said impurities in the amount of 0.10% by weight or lower.

12. A process for producing the polyamide resin according to claim 1, including a step of removing said impurities before or during the polycondensation, so as to achieve said polyamide resin having said total content of said impurities.

* * * * *